US007945500B2

(12) United States Patent
Fell et al.

(10) Patent No.: US 7,945,500 B2
(45) Date of Patent: May 17, 2011

(54) SYSTEM AND METHOD FOR PROVIDING AN INSURANCE PREMIUM FOR PRICE PROTECTION

(75) Inventors: Robert M. Fell, Summerland, CA (US); Scott Painter, Bel Air, CA (US); Brian P. Reed, Southlake, TX (US); Michael R. Bonsignore, Seattle, WA (US); Gary A. Magnuson, Corpus Christi, TX (US)

(73) Assignee: Pricelock, Inc., Irving, TX (US)

(*) Notice: Subject to any disclaimer, the term of this patent is extended or adjusted under 35 U.S.C. 154(b) by 270 days.

(21) Appl. No.: 12/099,224

(22) Filed: Apr. 8, 2008

(65) Prior Publication Data

US 2008/0306777 A1 Dec. 11, 2008

Related U.S. Application Data

(60) Provisional application No. 60/922,528, filed on Apr. 9, 2007.

(51) Int. Cl.
*G06Q 40/00* (2006.01)

(52) U.S. Cl. .................. 705/36 R; 705/35; 705/37

(58) Field of Classification Search .............. 705/35, 705/36 R, 37
See application file for complete search history.

(56) References Cited

U.S. PATENT DOCUMENTS

| | | | |
|---|---|---|---|
| 3,691,527 A | 9/1972 | Yamamoto | |
| 3,852,576 A | 12/1974 | Rudd | |
| 4,723,212 A | 2/1988 | Mindrum et al. | |
| 4,821,186 A | 4/1989 | Munakata et al. | |
| 4,825,045 A | 4/1989 | Humble | |
| 4,910,672 A | 3/1990 | Off et al. | |
| 5,056,019 A | 10/1991 | Schultz et al. | |
| 5,173,851 A | 12/1992 | Off et al. | |
| 5,200,889 A | 4/1993 | Mori | |
| 5,202,826 A | 4/1993 | McCarthy | |
| 5,481,094 A | 1/1996 | Suda | |
| 5,521,364 A | 5/1996 | Kimura et al. | |
| 5,612,868 A | 3/1997 | Off et al. | |
| 5,710,887 A | 1/1998 | Chelliah et al. | |
| 5,806,045 A | 9/1998 | Biorge et al. | |
| 5,822,735 A | 10/1998 | De Lapa et al. | |
| 5,862,222 A | 1/1999 | Gunnarsson | |
| 5,873,069 A | 2/1999 | Reuhl et al. | |

(Continued)

FOREIGN PATENT DOCUMENTS

AU 2006100751 A4 12/2006

(Continued)

OTHER PUBLICATIONS

Fuel Hardy As gas and oil prices rise, shoppers can place a premium on the pennies they save by using their heads at the pump; [All Edition] Kristen Andresen. Bangor Daily News. Bangor, Me.: Oct. 1, 2005. p. 2.*

(Continued)

*Primary Examiner* — Lalita M Hamilton
(74) *Attorney, Agent, or Firm* — Sprinkle IP Law Group

(57) ABSTRACT

Systems and methods for providing an insurance premium in association with an insurance strike price for a commodity are disclosed. By paying the insurance premium a consumer may obtain price protection for a commodity purchase. In particular, in one embodiment a consumer may obtain the right to be reimbursed for any amount paid over the insurance strike price for the commodity.

20 Claims, 6 Drawing Sheets

| HCPG | LOCALE | TIME PERIOD | GRADE | INSURANCE STRIKE PRICE |
|---|---|---|---|---|
| $.30 | AUSTIN | 6 MONTHS | DIESEL | $3.00 PER GALLON |
| $.38 | DALLAS | 6 MONTHS | DIESEL | $3.10 PER GALLON |
| ⋮ | ⋮ | ⋮ | ⋮ | ⋮ |
| $.45 | HOUSTON | 6 MONTHS | DIESEL | $2.95 PER GALLON |

| HCPG | LOCALE | TIME PERIOD | GRADE | FINANCIAL INSTITUTION STRIKE PRICE |
|---|---|---|---|---|
| $.35 | AUSTIN | 1 YR | PREMIUM | $3.20 PER GALLON |
| $.40 | DALLAS | 1 YR | PREMIUM | $3.35 PER GALLON |
| ⋮ | ⋮ | ⋮ | ⋮ | ⋮ |
| $.55 | HOUSTON | 1 YR | PREMIUM | $3.05 PER GALLON |

U.S. PATENT DOCUMENTS

| | | |
|---|---|---|
| 5,890,137 A | 3/1999 | Koreeda |
| 6,078,900 A | 6/2000 | Ettl et al. |
| 6,098,879 A | 8/2000 | Terranova |
| 6,112,981 A | 9/2000 | McCall |
| 6,116,505 A | 9/2000 | Withrow |
| 6,145,741 A | 11/2000 | Wisdom et al. |
| 6,151,565 A | 11/2000 | Lobley et al. |
| 6,152,591 A | 11/2000 | McCall et al. |
| 6,157,871 A | 12/2000 | Terranova |
| 6,193,155 B1 | 2/2001 | Walker et al. |
| 6,249,772 B1 | 6/2001 | Walker et al. |
| 6,298,329 B1 | 10/2001 | Walker et al. |
| 6,321,984 B1 | 11/2001 | McCall et al. |
| 6,332,128 B1 | 12/2001 | Nicholson |
| 6,422,464 B1 | 7/2002 | Terranova |
| 6,526,277 B1 | 2/2003 | Zicker et al. |
| 6,594,644 B1 | 7/2003 | Van Dusen |
| 6,601,033 B1 | 7/2003 | Sowinski |
| 6,611,811 B1 | 8/2003 | Deaton |
| 6,637,648 B1 | 10/2003 | Gilgen et al. |
| 6,732,081 B2 | 5/2004 | Nicholson |
| 6,741,968 B2 | 5/2004 | Jacoves et al. |
| 6,741,969 B1 | 5/2004 | Chen et al. |
| 6,754,636 B1 | 6/2004 | Walker |
| 6,778,967 B1 | 8/2004 | Nicholson |
| 6,862,580 B1 | 3/2005 | Ford |
| 6,862,612 B1 | 3/2005 | Horn |
| 6,885,996 B2 | 4/2005 | Nicholson |
| 6,965,872 B1 | 11/2005 | Grdina |
| 6,980,960 B2 | 12/2005 | Hajdukiewicz et al. |
| 7,054,837 B2 | 5/2006 | Hoffman et al. |
| 7,080,026 B2 | 7/2006 | Singh et al. |
| 7,080,034 B1 | 7/2006 | Reams |
| 7,092,929 B1 | 8/2006 | Dvorak et al. |
| 7,162,444 B1 | 1/2007 | Machado, Jr. et al. |
| 7,343,341 B2 | 3/2008 | Sandor et al. |
| 7,346,520 B2 | 3/2008 | Etzioni et al. |
| 7,373,320 B1 | 5/2008 | McDonough |
| 7,376,580 B1 | 5/2008 | Walker et al. |
| 7,376,603 B1 | 5/2008 | Mayr et al. |
| 7,379,890 B2 | 5/2008 | Myr et al. |
| 7,383,204 B2 | 6/2008 | McCall et al. |
| 7,437,323 B1 | 10/2008 | Valkov et al. |
| 7,617,111 B1 | 11/2009 | Sheppard et al. |
| 7,650,109 B2 | 1/2010 | Shimakawa et al. |
| 7,747,500 B2 | 6/2010 | Hwang et al. |
| 2001/0039512 A1 | 11/2001 | Nicholson |
| 2001/0042036 A1 | 11/2001 | Sanders |
| 2001/0049626 A1 | 12/2001 | Nicholson |
| 2001/0049651 A1 | 12/2001 | Selleck |
| 2001/0049668 A1 | 12/2001 | Wright |
| 2002/0013758 A1 | 1/2002 | Khaitan |
| 2002/0026403 A1 | 2/2002 | Tambay et al. |
| 2002/0029171 A1 | 3/2002 | Senior |
| 2002/0035549 A1 | 3/2002 | Hagio et al. |
| 2002/0038279 A1 | 3/2002 | Samuelson et al. |
| 2002/0040321 A1 | 4/2002 | Nicholson |
| 2002/0052793 A1 | 5/2002 | Dines et al. |
| 2002/0069155 A1 | 6/2002 | Nafeh et al. |
| 2002/0073007 A1 | 6/2002 | Ayache |
| 2002/0120555 A1 | 8/2002 | Lerner |
| 2002/0138392 A1 | 9/2002 | LeBlanc |
| 2002/0143616 A1 | 10/2002 | Hajdukiewicz |
| 2002/0143693 A1 | 10/2002 | Soestbergen et al. |
| 2002/0161645 A1 | 10/2002 | Walker et al. |
| 2002/0165809 A1 | 11/2002 | Gendelman |
| 2002/0194094 A1 | 12/2002 | Lancaster et al. |
| 2003/0014287 A1 | 1/2003 | Williams et al. |
| 2003/0018573 A1 | 1/2003 | Comas et al. |
| 2003/0033154 A1 | 2/2003 | Hajdukiewicz |
| 2003/0050807 A1 | 3/2003 | Hoffman et al. |
| 2003/0074267 A1 | 4/2003 | Acharya et al. |
| 2003/0078787 A1 | 4/2003 | Hoffman et al. |
| 2003/0088435 A1 | 5/2003 | King |
| 2003/0088466 A1 | 5/2003 | Fitzpatrick |
| 2003/0101123 A1 | 5/2003 | Alvarado et al. |
| 2003/0101125 A1 | 5/2003 | McGill et al. |
| 2003/0158773 A1 | 8/2003 | Brunner |
| 2003/0195822 A1 | 10/2003 | Tatge et al. |
| 2003/0197060 A1 | 10/2003 | Coyner |
| 2003/0208430 A1 | 11/2003 | Gershon |
| 2003/0208437 A1 | 11/2003 | Samuelson |
| 2003/0229571 A1 | 12/2003 | May |
| 2003/0236738 A1 | 12/2003 | Lange et al. |
| 2004/0015454 A1 | 1/2004 | Raines et al. |
| 2004/0024692 A1 | 2/2004 | Turbeville et al. |
| 2004/0034584 A1 | 2/2004 | Cory, Sr. et al. |
| 2004/0039684 A1 | 2/2004 | Sandor |
| 2004/0088179 A1 | 5/2004 | Cogen et al. |
| 2004/0093298 A1 | 5/2004 | McClure, III et al. |
| 2004/0103003 A1 | 5/2004 | Mayers et al. |
| 2004/0111358 A1 | 6/2004 | Lange et al. |
| 2004/0117291 A1 | 6/2004 | O'Callahan |
| 2004/0122732 A1 | 6/2004 | Comer |
| 2004/0122764 A1 | 6/2004 | Bilski et al. |
| 2004/0128263 A1 | 7/2004 | Dosanjh |
| 2004/0138927 A1 | 7/2004 | Eydeland et al. |
| 2004/0148236 A1 | 7/2004 | Steidlmayer |
| 2004/0148249 A1 | 7/2004 | Kinnear |
| 2004/0158493 A1 | 8/2004 | Nicholson |
| 2004/0177019 A1 | 9/2004 | Slavov et al. |
| 2004/0210478 A1 | 10/2004 | Pettigrew et al. |
| 2004/0215529 A1 | 10/2004 | Foster et al. |
| 2004/0230493 A1 | 11/2004 | Tatge et al. |
| 2004/0230520 A1 | 11/2004 | Reding et al. |
| 2004/0260613 A1 | 12/2004 | Mills |
| 2004/0260632 A1 | 12/2004 | Wanasek |
| 2005/0027650 A1 | 2/2005 | Walker et al. |
| 2005/0044001 A1 | 2/2005 | Narayanaswami |
| 2005/0091139 A1 | 4/2005 | Kumar et al. |
| 2005/0097025 A1 | 5/2005 | Horton et al. |
| 2005/0114252 A1 | 5/2005 | Beurskens |
| 2005/0144100 A1 | 6/2005 | Shapiro et al. |
| 2005/0149402 A1 | 7/2005 | Nicholson |
| 2005/0154669 A1 | 7/2005 | Streetman |
| 2005/0159974 A1 | 7/2005 | Moss et al. |
| 2005/0160006 A1 | 7/2005 | Pate |
| 2005/0160014 A1 | 7/2005 | Moss et al. |
| 2005/0182660 A1 | 8/2005 | Henley |
| 2005/0192711 A1 | 9/2005 | Raines et al. |
| 2005/0209917 A1 | 9/2005 | Anderson et al. |
| 2005/0209921 A1 | 9/2005 | Roberts et al. |
| 2005/0216384 A1 | 9/2005 | Partlow et al. |
| 2005/0228747 A1 | 10/2005 | Gumport |
| 2005/0240492 A1 | 10/2005 | Grdina |
| 2005/0261916 A1 | 11/2005 | McCall |
| 2005/0289021 A1 | 12/2005 | Lagergren |
| 2006/0015424 A1 | 1/2006 | Esposito et al. |
| 2006/0026095 A1 | 2/2006 | Alvarado et al. |
| 2006/0031123 A1 | 2/2006 | Leggett et al. |
| 2006/0036530 A1 | 2/2006 | Shkedy |
| 2006/0080196 A1 | 4/2006 | Griffin et al. |
| 2006/0080265 A1 | 4/2006 | Hinds et al. |
| 2006/0085252 A1 | 4/2006 | Kersenbrock |
| 2006/0095362 A1* | 5/2006 | Hwang et al. .................. 705/37 |
| 2006/0155423 A1 | 7/2006 | Budike |
| 2006/0184445 A1 | 8/2006 | Sandor et al. |
| 2006/0190383 A1 | 8/2006 | May |
| 2006/0190386 A1 | 8/2006 | Levy |
| 2006/0212384 A1 | 9/2006 | Spurgin et al. |
| 2006/0212393 A1 | 9/2006 | Brown |
| 2006/0218056 A1 | 9/2006 | Dickman |
| 2006/0241951 A1 | 10/2006 | Cynamom et al. |
| 2006/0293947 A1 | 12/2006 | Nicholson |
| 2006/0293952 A1 | 12/2006 | Nicholson |
| 2006/0293953 A1 | 12/2006 | Nicholson |
| 2006/0293980 A1 | 12/2006 | Corby et al. |
| 2007/0016502 A1 | 1/2007 | Williamson et al. |
| 2007/0032941 A1 | 2/2007 | Allen |
| 2007/0038553 A1 | 2/2007 | Miller et al. |
| 2007/0061174 A1 | 3/2007 | Phillips |
| 2007/0061220 A1 | 3/2007 | Vaid |
| 2007/0095890 A1 | 5/2007 | Elefant |
| 2007/0106559 A1 | 5/2007 | Harrell |
| 2007/0195486 A1 | 8/2007 | Paul et al. |
| 2007/0198385 A1 | 8/2007 | McGill et al. |
| 2007/0203793 A1 | 8/2007 | Hajdukiewicz et al. |

| | | | |
|---|---|---|---|
| 2007/0203794 A1 | 8/2007 | Hajdukiewicz et al. | |
| 2007/0233616 A1 | 10/2007 | Richards et al. | |
| 2007/0255457 A1 | 11/2007 | Whitcomb et al. | |
| 2007/0267479 A1 | 11/2007 | Nix et al. | |
| 2007/0267482 A1 | 11/2007 | Ruckart et al. | |
| 2007/0276738 A1 | 11/2007 | Rajunas, III | |
| 2007/0288312 A1 | 12/2007 | Wang | |
| 2007/0294159 A1 | 12/2007 | Cottleq | |
| 2008/0005008 A1 | 1/2008 | Alvarado et al. | |
| 2008/0015964 A1* | 1/2008 | Shuster | 705/36 R |
| 2008/0015976 A1 | 1/2008 | Sandor et al. | |
| 2008/0015981 A1 | 1/2008 | Danesh | |
| 2008/0027737 A1 | 1/2008 | Watkins | |
| 2008/0033833 A1 | 2/2008 | Senior | |
| 2008/0080682 A1 | 4/2008 | Ogunwale et al. | |
| 2008/0097877 A1 | 4/2008 | Rahal | |
| 2008/0097888 A1 | 4/2008 | Sugihara | |
| 2008/0114622 A1 | 5/2008 | Crean et al. | |
| 2008/0126208 A1 | 5/2008 | Nicholson et al. | |
| 2008/0133430 A1 | 6/2008 | Horowitz | |
| 2008/0243663 A1 | 10/2008 | Eveland | |
| 2009/0198621 A1 | 8/2009 | Schneier et al. | |
| 2010/0042488 A1 | 2/2010 | McClung, III | |

FOREIGN PATENT DOCUMENTS

| | | |
|---|---|---|
| AU | 2007100932 A4 | 10/2007 |
| CA | 2070736 | 12/1992 |
| CA | 2217739 A1 | 4/1996 |
| CA | 2340966 A1 | 9/2001 |
| JP | 2217998 A | 8/1990 |
| JP | 04373069 A | 12/1992 |
| JP | 10111985 A | 4/1998 |
| JP | 2002063347 A | 2/2002 |
| JP | 2002215640 A | 8/2002 |
| JP | 2003108850 A | 4/2003 |
| JP | 2003128198 A | 5/2003 |
| JP | 2003233743 A | 8/2003 |
| JP | 2004145534 A1 | 5/2004 |
| JP | 2004252569 A | 9/2004 |
| JP | 2004318422 A | 11/2004 |
| JP | 2005122766 A | 5/2005 |
| JP | 2005135347 A | 5/2005 |
| JP | 2006335438 A | 12/2006 |
| JP | 2007122592 A | 5/2007 |
| JP | 2007249410 A | 9/2007 |
| WO | WO 9118373 A1 | 11/1991 |
| WO | WO 9214213 | 8/1992 |
| WO | WO 9301466 A1 | 1/1993 |
| WO | WO 9309398 A1 | 5/1993 |
| WO | WO 9606415 | 2/1996 |
| WO | WO 9706250 | 2/1997 |
| WO | WO 9818053 A1 | 4/1998 |
| WO | WO 9835490 A1 | 8/1998 |
| WO | WO 0003022 A2 | 1/2000 |
| WO | WO 0104327 | 1/2001 |
| WO | WO 0125875 A2 | 4/2001 |
| WO | WO 0125989 A1 | 4/2001 |
| WO | WO 0126000 A1 | 4/2001 |
| WO | WO 0126003 A1 | 4/2001 |
| WO | WO 0155885 A2 | 8/2001 |
| WO | WO0161671 A | 8/2001 |
| WO | WO 0177961 A1 | 10/2001 |
| WO | WO 0188743 A2 | 11/2001 |
| WO | WO 0195225 A1 | 12/2001 |
| WO | WO 0211018 A1 | 2/2002 |
| WO | WO 0212113 A1 | 2/2002 |
| WO | WO 0213091 A1 | 2/2002 |
| WO | WO 0217193 A1 | 2/2002 |
| WO | WO 0233621 A1 | 4/2002 |
| WO | WO 0233635 A1 | 4/2002 |
| WO | WO 0233636 A1 | 4/2002 |
| WO | WO 0233637 A1 | 4/2002 |
| WO | WO 0241120 A2 | 5/2002 |
| WO | WO 0244847 A2 | 6/2002 |
| WO | WO 02061663 A2 | 8/2002 |
| WO | WO 02069109 A2 | 9/2002 |
| WO | WO 02069110 A2 | 9/2002 |
| WO | WO 02075485 A2 | 9/2002 |
| WO | WO 02075488 A2 | 9/2002 |
| WO | WO 02079923 A2 | 10/2002 |
| WO | WO 02079940 A1 | 10/2002 |
| WO | WO 02080041 A1 | 10/2002 |
| WO | WO 02088888 A2 | 11/2002 |
| WO | WO 02088906 A2 | 11/2002 |
| WO | WO 02093302 A2 | 11/2002 |
| WO | WO 02093328 A2 | 11/2002 |
| WO | WO 02098045 A2 | 12/2002 |
| WO | WO 02099589 A2 | 12/2002 |
| WO | WO 02099601 A2 | 12/2002 |
| WO | WO 02103487 A2 | 12/2002 |
| WO | WO 02103489 A2 | 12/2002 |
| WO | WO 03003150 A2 | 1/2003 |
| WO | WO 03012584 A2 | 2/2003 |
| WO | WO 03012585 A2 | 2/2003 |
| WO | WO 03012586 A2 | 2/2003 |
| WO | WO 03012589 A2 | 2/2003 |
| WO | WO 03032112 A2 | 4/2003 |
| WO | WO 03036432 A2 | 5/2003 |
| WO | WO 03036466 A1 | 5/2003 |
| WO | WO 03038375 A1 | 5/2003 |
| WO | WO 03038547 A2 | 5/2003 |
| WO | WO 03038651 A1 | 5/2003 |
| WO | WO 03038675 A1 | 5/2003 |
| WO | WO 03038676 A1 | 5/2003 |
| WO | WO 03053124 A2 | 7/2003 |
| WO | WO 03062738 A2 | 7/2003 |
| WO | WO 03065278 A1 | 8/2003 |
| WO | WO 03069433 A2 | 8/2003 |
| WO | WO 03069840 A1 | 8/2003 |
| WO | WO 03077054 A2 | 9/2003 |
| WO | WO 03079214 A1 | 9/2003 |
| WO | WO 03087708 A1 | 10/2003 |
| WO | WO 03098516 A1 | 11/2003 |
| WO | WO 03104938 A2 | 12/2003 |
| WO | WO 03104944 A2 | 12/2003 |
| WO | WO 03105054 A1 | 12/2003 |
| WO | WO 2004001537 A2 | 12/2003 |
| WO | WO 2004001538 A2 | 12/2003 |
| WO | WO 2004001544 A2 | 12/2003 |
| WO | WO 2004003699 A2 | 1/2004 |
| WO | WO 2004003811 A1 | 1/2004 |
| WO | WO 2004010262 A2 | 1/2004 |
| WO | WO 2004021102 A2 | 3/2004 |
| WO | WO 2004029781 A2 | 4/2004 |
| WO | WO 2004046989 A1 | 6/2004 |
| WO | WO 2004047082 A2 | 6/2004 |
| WO | WO2004059547 A1 | 7/2004 |
| WO | WO 2004061596 A2 | 7/2004 |
| WO | WO 2004061785 A2 | 7/2004 |
| WO | WO 2004072778 A2 | 8/2004 |
| WO | WO 2004072803 A2 | 8/2004 |
| WO | WO 2004077256 A2 | 9/2004 |
| WO | WO 2004084028 A2 | 9/2004 |
| WO | WO 2004084046 A2 | 9/2004 |
| WO | WO 2005057458 A1 | 6/2005 |
| WO | WO 2005065131 A2 | 7/2005 |
| WO | WO2005069871 A2 | 8/2005 |
| WO | WO 2005101996 A2 | 11/2005 |
| WO | WO 2006049779 A1 | 5/2006 |
| WO | WO2006055117 A2 | 5/2006 |
| WO | WO 2006083709 A2 | 8/2006 |
| WO | WO 2006110121 A1 | 10/2006 |
| WO | WO 2007002065 A2 | 1/2007 |
| WO | WO200704443 A2 | 4/2007 |
| WO | WO2007059165 A1 | 5/2007 |
| WO | WO2007079228 A2 | 7/2007 |

OTHER PUBLICATIONS

Locked-in rates for heating oil burn consumers; [Final Edition] David Dishneau Associated Press. Journal—Gazette. Ft. Wayne, Ind.: Oct. 11, 2006. p. 3.E.*
GasLimit "Frequently Asked Questions", 2 pages, obtained from http://www.gaslimit.com/faq on Jan. 2, 2008.
GasLimit "Current Gas Prices", 2 pages, obtained from http://www.gaslimit.com/current-gas-prices.php on Jan. 2, 2008.
GasLimit "Terms and Conditions", 4 pages, obtained from http://www.gaslimit.com/terms_and_condition on Jan. 2, 2008.

GasLimit "Quote Steps 1-5", 5 pages, obtained from http://www.gaslimit.com/legacy on Jan. 2, 2008.
GasLimit "Gas Cap Cancellation Information", 1 page, obtained from http://www.gaslimit.com/cancel_info on Jan. 2, 2008.
"Price Changes in the Gasoline Market: Are Midwestern Gasoline Prices Downward Sticky?", Energy Information Administration, Wash., DC; DOE/EIA-0626, pp. i-55, Feb. 1999.
Jacobson, S. "Recognizing Embedded Risks in Energy", 4 pages, downloaded from http://www.derivativesstrategy.com/magazine/archive/1999/1299col4.asp on Jan. 11, 2008.
Gordon, et al. Modelling Farm-Retail Price Linkage for Eight Agricultural Commodities (Technical Report #1/96), 65 pgs, Dept. of Econ, Univ. of Canada & Auckland, Nov. 1996.
Ervin, S., "Commodity Futures Modernization Act of 2000: A Practical Look at the Law that Revolutionized Derivatives Law and Regulation," 6 pages, Copyright 2001 Dechert.
Commodity Futures Trading Commission, Order, DOCID: fr21mr03-45; Federal Register, Notices, vol. 68, No. 55, pp. 1-6, Mar. 21, 2003, obtained from <<wais.access.gpo.gov>>.
"Congress Makes Changes to the Regulation of Futures and Derivatives Transactions", Publications/McDermott Newsletters, McDermott Will and Emery, 10 pages, Jan. 2001.
Marsh, J., Regulation of "Specialist Commodity Dealers" in the United States, Hunton & Williams, London, England, 10 pages, Oct. 19, 2005, obtained from <<www.hunton.com>>.
Request for Continued Examination, Extension of Time and Amendment as filed with U.S. Patent Office on Oct. 6, 2006 in U.S. Appl. No. 09/853,196; 17 pages.
Office Action mailed from U.S. Patent Office on Dec. 13, 2006 in U.S. Appl. No. 09/805,950; 11 pages.
Office Action mailed from U.S. Patent Office on Dec. 15, 2006 in U.S. Appl. No. 09/853,196; 11 pages.
Asplund, M., et al. "Price Adjustments by a Gasoline Retail Chain", Scand. J. of Economics 102(1), 101-121, 2000.
Fischer, A., "Weather futures 'bet' will give Tucson firms a hedge against losses," Arizona Daily Star, Tucson, Arizona, Feb. 5, 1999, 3 pages.
Fuel Bank: lock in your price for gasoline, obtained from http://www.fuelbank.com on May 19, 2008, 1 page.
Tommelleo, D., "Priceline.Com plans to let Customers set Prices for Gasoline", The Augusta Chronicle, Augusta, Georgia, Feb. 26, 2000, 2 pages.
Skyline Products: Central Control Fuel Pricing Software, obtained from http://skylineproducts.com on Feb. 10, 2007, 3 pages.
Skyline Products Inc. Press Release: Skyline Products Partners with Excentus to Offer a Certified Fuel Pricing Integration for High-Volume Retailers, 1 page.
PCT/US2008/053686, International Search Report and Written Opinion mailed Jun. 5, 2008.
PCT/US2008/053669, International Search Report and Written Opinion mailed Jun. 5, 2008.
PCT/US2008/053676, International Search Report and Written Opinion mailed Jun. 5, 2008.
PCT/US2008/053674, International Search Report and Written Opinion mailed Jun. 5, 2008.
PCT/US2008/053687, International Search Report and Written Opinion mailed Jun. 5, 2008.
Chao, et al. "Restructured Electricity Markets: A Risk Management Approach", [Retrieved online from URL:http://www.ieor.berkeley.edu], presented Jul. 1, 2005, 36 pages.
PCT/US2008/053724, International Search Report and Written Opinion mailed Jun. 5, 2008.
PCT/US2008/053695, International Search Report and Written Opinion mailed Jun. 5, 2008.
PCT/US2008/59633, International Search Report and Written Opinion mailed Jul. 8, 2008.
PCT/US2008/059609, International Search Report and Written Opinion mailed Jul. 1, 2008.
PCT/US2008/053699, International Search Report and Written Opinion mailed Jun. 27, 2008.
PCT/US2008/059619, International Search Report and Written Opinion mailed Aug. 15, 2008.
PCT/US2008/059614, International Search Report and Written Opinion mailed Aug. 25, 2008.
Office Action issued for U.S. Appl. No. 12/030,073, mailed on May 1, 2009, 11 pgs.
Office Action issued for U.S. Appl. No. 11/705,571, mailed on Aug. 14, 2009, 13 pgs.
International Preliminary Report on Patentability for PCT Application No. PCT/US2008/053669, mailed Aug. 27, 2009, issued Aug. 19, 2009, 9 pgs.
International Preliminary Report on Patentability for PCT Application No. PCT/US2008/053676, mailed Aug. 27, 2009, issued Aug. 19, 2009, 6 pgs.
International Preliminary Report on Patentability for PCT Application No. PCT/US2008/053674, mailed Aug. 27, 2009, issued Aug. 19, 2009, 7 pgs.
International Preliminary Report on Patentability for PCT Application No. PCT/US2008/053686, mailed Aug. 27, 2009, issued Aug. 19, 2009, 6 pgs.
International Preliminary Report on Patentability for PCT Application No. CT/US2008/053687, mailed Aug. 27, 2009, issued Aug. 19, 2009, 6 pgs.
International Preliminary Report on Patentability for PCT Application No. PCT/US2008/053695, mailed Aug. 27, 2009, issued Aug. 19, 2009, 5 pgs.
International Preliminary Report on Patentability for PCT Application No. PCT/US2008/053699, mailed Aug. 27, 2009, issued Aug. 19, 2009, 5 pgs.
International Preliminary Report on Patentability for PCT Application No. PCT/US2008/053724, mailed Aug. 27, 2009, issued Aug. 19, 2009, 6 pgs.
International Preliminary Report on Patentability for PCT Application No. PCT/US2008/059633, issued Oct. 13, 2009, mailed Oct. 22, 2009, 6 pgs.
International Preliminary Report on Patentability for PCT Application No. PCT/US2008/059619, issued Oct. 13, 2009, mailed Oct. 22, 2009, 6 pgs.
International Preliminary Report on Patentability for PCT Application No. PCT/US2008/059609, issued Oct. 13, 2009, mailed Oct. 22, 2009, 6 pgs.
International Preliminary Report on Patentability for PCT Application No. PCT/US2008/059614, issued Oct. 13, 2009, mailed Oct. 22, 2009, 4 pgs.
Final Office Action issued for U.S. Appl. No. 12/030,073 mailed on Nov. 24, 2009, 12 pgs.
Office Action issued for U.S. Appl. No. 12/370,430, mailed on Jan. 20, 2010, 14 pgs.
Office Action issued for U.S. Appl. No. 11/705,571, mailed on Apr. 23, 2010, 16 pgs.
Office Action issued for U.S. Appl. No. 12/099,237, mailed May 21, 2010, 8 pgs.
Office Action issued for U.S. Appl. No. 12/099,253, mailed May 25, 2010, 9 pgs.
Office Action issued for U.S. Appl. No. 12/029,961, mailed Jun. 23, 2010, 13 pgs.
Office Action issued for U.S. Appl. No. 12/370,430, mailed Jul. 7, 2010, 13 pgs.
Office Action issued for U.S. Appl. No. 12/030,012, mailed Jul. 22, 2010, 12 pgs.
Office Action issued for U.S. Appl. No. 12/099,209, mailed Aug. 3, 2010, 17 pgs.
Office Action issued for U.S. Appl. No. 12/030,032, mailed Sep. 28, 2010, 9 pgs.
Office Action issued for U.S. Appl. No. 12/370,395, mailed Oct. 7, 2010, 11 pgs.
Office Action issued for U.S. Appl. No. 12/099,253 mailed Oct. 26, 2010, 10 pgs.
Office Action issued for U.S. Appl. No. 12/030,119 mailed Oct. 27, 2010, 16 pgs.
TechWeb, "Bargain Hunters Topple AAA Gas-Price Finder," Manhasset, May 27, 2005, (1 pg.).
Shanley, Will, "Drivers can Use the Internet to Find Cheap Gasoline," Knight Ridder Tribune Business News, Washington, May 26, 2005, (1 pg.).

Day to Day, "Using the Internet to Search for Cheap Gas," Los Angeles, Apr. 27, 2006, (1 pg.).

Maunsell, Nevill Boyd, "City View: Savers and Borrowers Hang on to Shares," Birmingham Post, Post Edition, Birmingham (UK), Nov. 30, 2000, (1 pg.).

Office Action issued for U.S. Appl. No. 12/099,237, mailed on Nov. 10, 2010, 7 pgs.

Office Action issued for U.S. Appl. No. 12/030,086, mailed on Dec. 21, 2010, 13 pgs.

Liu, Lon-Mu, "Dynamic Relationship Analysis of US Gasoline and Crude Oil Prices," Journal of Forecasting, Sep. 1991, p. 521-547. (27 pgs.).

John M. Barron, Beck A. Taylor and John R. Umbeck, "Will Open Supply Lower Retail Gasoline Prices?" Contemporary Economic Policy, Jan. 2004, pp. 63-77. (15 pgs).

Franklin R. Edwards and Michael S. Carter, "The Collapse of Metallgesellschaft: Unhedgeable Risks, Poor Hedging Strategy, or Just Bad Luck?" The Journal of Futures Markets, May 1995, p. 211. (54 pgs.).

Office Action issued for U.S. Appl. No. 12/029,961, mailed on Nov. 17, 2010, 15 pgs.

Office Action issued for U.S. Appl. No. 12/030,041, mailed on Nov. 16, 2010, 14 pgs.

Office Action issued for U.S. Appl. No. 12/370,430, mailed on Jan. 13, 2011, 15 pgs.

Office Action issued for U.S. Appl. No. 12/099,209, mailed on Jan. 20, 2011, 19 pgs.

Office Action issued for U.S. Appl. No. 11/705,571, mailed Jan. 26, 2011, 20 pgs.

Roger G. Clarke, "Options and Futures: A Tutorial," The Research Foundation of the Institute of Chartered Financial Analysis, Dec. 1992/Rev. Aug. 1996, 46 pgs.

Phil Shook, "Futures Trading: The Fine Art of Managing Risk, or Shooting," NPN, National Petroleum News, Chicago: Feb. 1992, vol. 84, Issue 2, p. 37, 7 pgs.

Notice of Allowance issued for U.S. Appl. No. 12/099,237, mailed on Mar. 3, 2011, 5 pgs.

\* cited by examiner

| HCPG | LOCALE | TIME PERIOD | GRADE | INSURANCE STRIKE PRICE |
|---|---|---|---|---|
| $.30 | AUSTIN | 6 MONTHS | DIESEL | $3.00 PER GALLON |
| $.38 | DALLAS | 6 MONTHS | DIESEL | $3.10 PER GALLON |
| ... | ... | ... | ... | ... |
| $.45 | HOUSTON | 6 MONTHS | DIESEL | $2.95 PER GALLON |

| HCPG | LOCALE | TIME PERIOD | GRADE | FINANCIAL INSTITUTION STRIKE PRICE |
|---|---|---|---|---|
| $.35 | AUSTIN | 1 YR | PREMIUM | $3.20 PER GALLON |
| $.40 | DALLAS | 1 YR | PREMIUM | $3.35 PER GALLON |
| ... | ... | ... | ... | ... |
| $.55 | HOUSTON | 1 YR | PREMIUM | $3.05 PER GALLON |

Pricelock Daily Pricing Matrix

14-Feb-08 <<Date
352 — $2.41

| 360 | Today's Retail Spot | 3 Month Calls | | | | 6 Month Calls | | | | 12 Month Calls | | | | 3 Month | 3 month Collar |
| --- | --- | --- | --- | --- | --- | --- | --- | --- | --- | --- | --- | --- | --- | --- | --- |
|  |  | ATM | +$0.10 | +$0.20 | +$0.30 | ATM | +$0.10 | +$0.20 | +$0.30 | ATM | +$0.10 | +$0.20 | +$0.30 | FIXED | -$0.30/ +$0.10 |
| Atlanta | $3.11 | | | | | | | | | | | | | | |
| Boston | $3.21 | | | | | | | | | | | | | | |
| Chicago | $3.13 | | | | | | | | | | | | | | |
| Cleveland | $3.11 | | | | | | | | | | | | | | |
| Denver | $3.23 | | | | | | | | | | | | | | |
| Detroit | $3.21 | | | | | | | | | | | | | | |
| Houston | $3.01 | | | | | | | | | | | | | | |
| Los Angeles | $3.41 | | | | | | | | | | | | | | |
| Miami | $3.21 | | | | | | | | | | | | | | |
| Minneapolis | $3.41 | | | | | | | | | | | | | | |
| New York City | $3.31 | | | | | | | | | | | | | | |
| Phoenix | $3.25 | | | | | | | | | | | | | | |
| St. Louis | $3.18 | | | | | | | | | | | | | | |
| SanFrancisco | $3.40 | | | | | | | | | | | | | | |
| Seattle | $3.11 | | | | | | | | | | | | | | |
| Toronto | $3.24 | | | | | | | | | | | | | | |
| Washington | $3.31 | | | | | | | | | | | | | | |

350 ↖   370 ↖ (on each section)

SYSTEM AND METHOD FOR PROVIDING AN INSURANCE PREMIUM FOR PRICE PROTECTION

RELATED INFORMATION

This application claims a benefit of priority to the filing date of U.S. Provisional Patent Application Ser. No. 60/922,528 by inventors Robert M. Fell, Scott Painter, Brian P. Reed, Michael R. Bonsignore and Gary A. Magnuson, entitled "SYSTEM AND METHOD FOR PROVIDING AN INSURANCE PREMIUM FOR PRICE PROTECTION" filed on Apr. 9, 2007, the entire contents of which are hereby expressly incorporated by reference for all purposes.

TECHNICAL FIELD

The present invention relates generally to price protection in the field of retail commodity purchasing. More particularly, the present invention relates to system and methods for providing an insurance premium for price protection with respect to a commodity price.

BACKGROUND

Almost all commodities that consumers purchase fluctuate in price on a regular basis. The periodicity of these fluctuations depends heavily on a variety of factors, including supply and demand, or variables associated with the supply and demand. Certain commodities are more volatile than others, however. These commodities are usually in relatively heavy demand or are widely consumed such that any disruption in the supply of the commodity may cause a commensurate market spike in the prices of these goods. Products of this type include fuel products such as gasoline or diesel, heating oil, natural fuel, crude oil, etc. Disruptions in the supply of these products (or commodities from which these products are produced) such as those caused by worlds events, natural disasters, etc. may cause the price of these commodities to jump markedly in a relatively short amount of time. These price spikes are quite noticeable, as these types of products are extensively consumed and fluctuations in the price of these products may occur relatively rapidly.

The severity of the effects of these price spikes on a given individual or entity is usually tied directly to the amount of the product consumed. Thus, while individual consumers are certainly affected by spikes in the price of a commodity such as gasoline or diesel, these effects may be even more pronounced with regards to large consumers of the commodity. For example, with respect to gasoline or diesel, businesses which rely on a fleet of vehicles to conduct their day to day operations may be severely financially strained by an increase in the price of the commodity. Furthermore, these constant fluctuations in price make anticipating future expenses for the commodity difficult, creating budgeting and accounting issues for these businesses.

Consequently, many individual consumers and businesses desire to financially protect themselves from potential increases in the price of a commodity to not only lower costs for themselves but, additionally, to create greater predictability in future costs for that commodity. There are currently a variety of schemes that allow consumers to purchase commodities, one example of these types of schemes is a fuel card, which is similar to the concept of a gift card. Consumers may purchase a fuel card such that the fuel card has an associated value. Whenever the fuel card is used to purchase fuel at a retail point of sale location, however, the retail price at the time of purchase may be used to subtract value from the fuel card. Thus, the consumer is not protected from adverse fluctuations in the market price of fuel.

Suppose, for example, that a consumer purchases a fuel card with a value of $100 dollars. The consumer may then make a first purchase of 4 gallons of fuel at a time when the retail price of fuel is $2.50, thus for this purchase a value of $10.00 (4 gallons times the $2.50 cost per gallon) is deducted from the value of the fuel card such that amount remaining on the fuel card which may be used to purchase fuel is $90.00. The consumer then makes a second purchase of 4 gallons of fuel at a different time where the retail price of fuel is $3.00. In this case, $12.00 (4 gallons times the $3.00 cost per gallon) is subtracted from the value of the fuel card such that the fuel card may still be used to purchase $78.00 (the $12.00 of the current purchase subtracted from the $90.00 of value remaining on the fuel card) of fuel. As can be seen then, when consumers utilize these schemes they are not protected from fluctuations in the retail price of a commodity as the purchase of the commodities at a particular time occurs at the retail price in effect at that time.

Some purchasing systems have been introduced in certain industry segments in an effort to address this issue. For example, there are certain schemes which allow a consumer to purchase a good or service and take later delivery, in whole or in part, such as purchasing a quantity of fuel which is physically deposited in a storage tank for future at will consumption. In other words the physical product itself has to be ordered and deposited into a storage facility, which has a limited capacity.

These types of systems are cumbersome for a variety of reasons: not only do they require dedicated storage, but additionally, delivery must be taken at the storage location itself. Moreover, the quantity of the commodity purchased has been pre-purchased, thus to utilize this method beneficially may require a preternatural ability to forecast where the market price for the product is going (e.g. will it become more or less expensive), estimate a consumption pattern for the commodity and, based upon these forecasts, estimates, current retail price, and myriad other factors, determine how much of the commodity is desired. As may be imagined these types of schemes are a rather impractical way for businesses to protect themselves against price fluctuations in a commodity and may be almost impossible for a consumer to utilize.

To remedy defects of the purchase and delivery systems discussed above, other schemes have been introduced whereby an individual consumer or a business consumer (for example a fleet manager) may purchase a quantity of a commodity (such as fuel) at the then prevailing retail price such that an account associated with the consumer is credited with the amount purchased. At this point, the physical commodity (e.g. fuel) has not actually been delivered but a quantity is held on reserve that can be redeemed in part or in whole at a variety of locations. While this type of system allows consumers or business to take delivery of the commodity in smaller quantities at a variety of locations it manifests many of the same problems as the purchase and delivery systems discussed above.

More specifically, while the delivery options have changed (e.g. it is now possible to take delivery at many locations in many installments instead of storing the purchase commodity) the purchasing of the commodity remains the same. In other words, in both cases the transaction for the commodity has been consummated; the consumer has made a purchase of a specified quantity of the commodity at a specified retail price.

Consequently, the drawbacks of the purchase and delivery systems discussed above apply equally well here. These systems require the ability to forecast the market for the commodity, estimate a consumption pattern for the good, and based upon these forecasts, estimates, the current retail price, and myriad other factors, determine how much of the commodity is desired.

From a financial perspective these types of systems have an even greater drawback: they only protect a consumer from potential up ticks in the retail price of the commodity. To elucidate, if a consumer purchases a certain quantity of a commodity at a certain retail price and the retail price for that commodity does indeed go up the consumer has saved himself the difference between the retail price at which he purchased and the increased retail price.

Suppose, however, that the consumer is incorrect in predicting that retail prices for the commodity will increase. In this case, the consumer is forced to choose between buying the commodity at the prevailing (lower) retail price and using the pre-purchased commodity (paid for at the previous higher retail price). This places the consumer in an undesirable situation. If the consumer's forecast for a needed quantity of a commodity is correct, the desired amount of the commodity has been pre-purchased and thus, buying the commodity at the prevailing retail price may lead to unused capacity vis-à-vis the commodity. The consumer must choose between saving the margin between the lower prevailing retail price and the pre-purchased price and having unused capacity.

Complicating the issue further, the more volatile the price of the commodity and the larger the volume of the commodity consumed the more complicated these types of calculations become. For example, suppose a fleet manager pre-purchases a quantity of fuel that he anticipates his fleet will utilize for a certain time period at a pre-purchase retail price. Everyday that the prevailing retail price for fuel is below the pre-purchase retail price the fleet manager must determine if it is financially beneficial to purchase fuel at the then prevailing retail price given the amount of fuel the fleet has consumed, the amount of fuel the fleet manager anticipates the fleet will consume, the pre-purchase retail price, the prevailing market price and a whole host of other variables. Many of these variables, however, remain in a constant state of flux. As may be imagined then, the calculations that the fleet manger must make to determine an optimum fuel purchasing strategy grow increasingly more complicated.

Thus, there is a need for systems and methods for commodity purchasing which allow consumers to protect against variability in the price for a commodity by allowing a consumer to protect against adverse fluctuations in the price of a commodity.

SUMMARY

Systems and methods for providing an insurance premium in association with an insurance strike price for a commodity are disclosed. In one embodiment, by paying the insurance premium a consumer may obtain price protection for a commodity purchase. Based on the insurance premium, in one embodiment, an intermediary may provide price protection contracts to consumers.

The functionalities and processes described herein can be implemented at least in part in suitable computer-executable instructions. The computer-executable instructions may be stored as software code components or modules on one or more computer readable media (for example, non-volatile memories, volatile memories, DASD arrays, magnetic tapes, floppy diskettes, hard drives, optical storage devices, or any other appropriate computer-readable medium or storage device). In one exemplary embodiment of the invention, the computer-executable instructions may include lines of complied C++, Java, HTML, or any other programming or scripting code.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements. Other objects and advantages of the present invention will become apparent to one skilled in the art upon reading and understanding the detailed description of the embodiments described herein and examples thereof.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 3A is a block diagram of one embodiment of an insurance strike price matrix.

FIG. 3B is a block diagram of one embodiment of an insurance strike price matrix.

DETAILED DESCRIPTION

Figure 1:
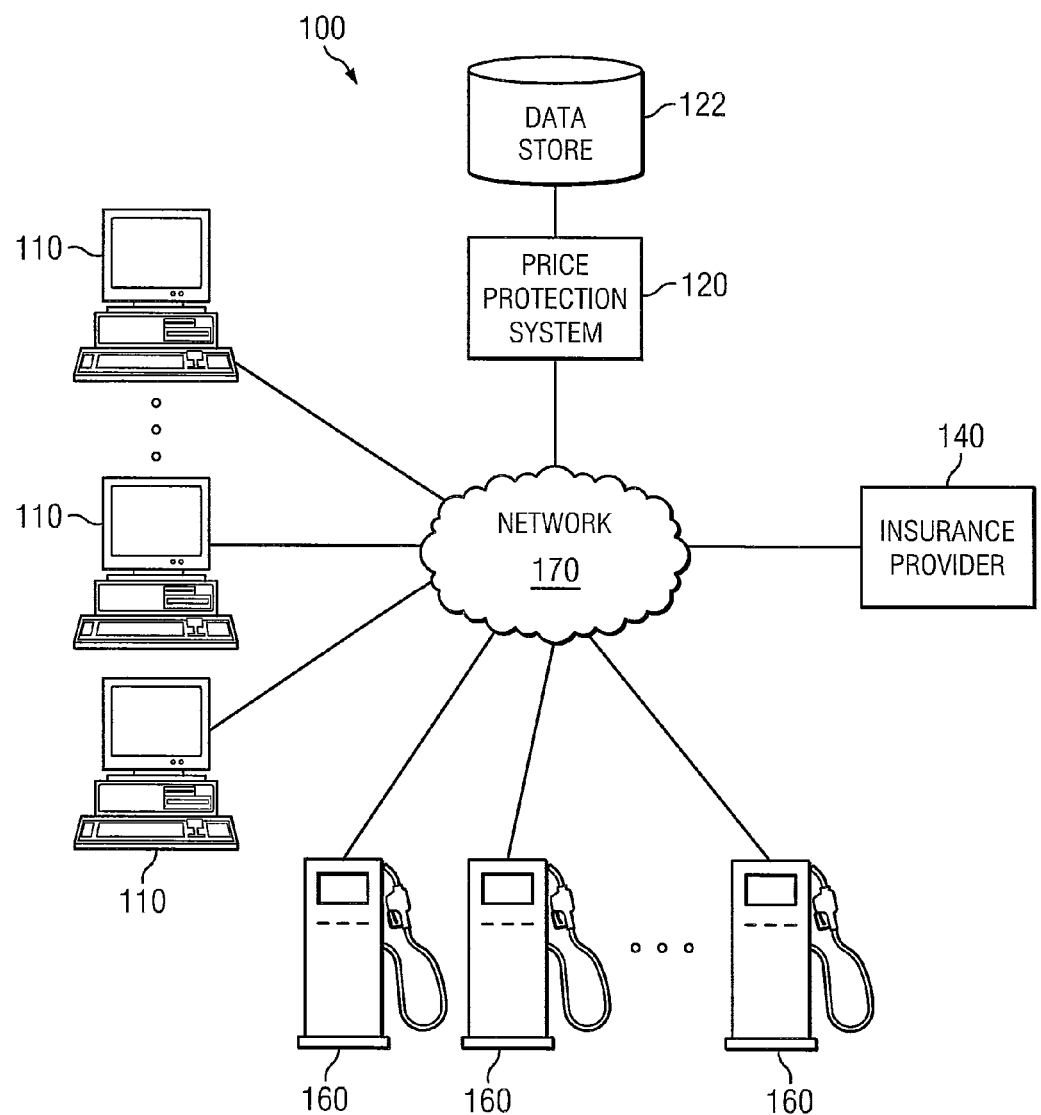
FIG. 1 is a block diagram illustrating one embodiment of a topology which may be used to implement embodiments of the present invention.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment", etc.

Reference is now made in detail to the exemplary embodiments of the invention, examples of which are illustrated in the accompanying drawings. Wherever possible, the same reference numbers will be used throughout the drawings to refer to the same or like parts (elements).

Within this disclosure, the term "commodity" refers to an article of commerce—an item that can be bought and sold freely on a market. It may be a product which trades on a commodity exchange or spot market and which may fall into one of several categories, including energy, food, grains, and metals. Currently, commodities that can be traded on a commodity exchange include, but are not limited to, crude oil, light crude oil, natural gas, heating oil, gasoline, propane, ethanol, electricity, uranium, lean hogs, pork bellies, live cattle, feeder cattle, wheat, corn, soybeans, oats, rice, cocoa, coffee, cotton, sugar, gold, silver, platinum, copper, lead, zinc, tin, aluminum, titanium, nickel, steel, rubber, wool, polypropylene, and so on. Note that a commodity can refer to tangible things as well as more ephemeral products. Foreign currencies and financial indexes are examples of the latter. For example, positions in the Goldman Sachs Commodity Index (GSCI) and the Reuters Jefferies Consumer Research Board Index (RJCRB Index) can be traded as a commodity. What matters is that something be exchanged for the thing. New York Mercantile Exchange (NYMEX) and Chicago Mercantile Exchange (CME) are examples of a commodity exchange. Other commodities exchanges also exist and are known to those skilled in the art.

In a simplified sense, commodities are goods or products with relative homogeneousness that have value and that are produced in large quantities by many different producers; the goods or products from each different producer are considered equivalent. Commoditization occurs as a goods or products market loses differentiation across its supply base. As such, items that used to carry premium margins for market participants have become commodities, of which crude oil is an example. However, a commodity generally has a definable quality or meets a standard so that all parties trading in the market will know what is being traded. In the case of crude oil, each of the hundreds of grades of fuel oil may be defined. For example, West Texas Intermediate (WTI), North Sea Brent Crude, etc. refer to grades of crude oil that meet selected standards such as sulfur content, specific gravity, etc., so that all parties involved in trading crude oil know the qualities of the crude oil being traded. Motor fuels such as gasoline represent examples of energy-related commodities that may meet standardized definitions. Thus, gasoline with an octane grade of 87 may be a commodity and gasoline with an octane grade of 93 may also be a commodity, and they may demand different prices because the two are not identical—even though they may be related. Those skilled in the art will appreciate that other commodities may have other ways to define a quality. Other energy-related commodities that may have a definable quality or that meet a standard include, but are not limited to, diesel fuel, heating oils, aviation fuel, and emission credits. Diesel fuels may generally be classified according to seven grades based in part on sulfur content, emission credits may be classified based on sulfur or carbon content, etc.

Historically, risk is the reason exchange trading of commodities began. For example, because a farmer does not know what the selling price will be for his crop, he risks the margin between the cost of producing the crop and the price he achieves. In some cases, investors can buy or sell commodities in bulk through futures contracts. The price of a commodity is subject to supply and demand.

A commodity may refer to a retail commodity that can be purchased by a consuming public and not necessarily the wholesale market only. One skilled in the art will recognize that embodiments disclosed herein may provide means and mechanisms through which commodities that currently can only be traded on the wholesale level may be made available to retail level for retail consumption by the public. One way to achieve this is to bring technologies that were once the private reserves of the major trading houses and global energy firms down to the consumer level and provide tools that are applicable and useful to the retail consumer so they can mitigate and/or manage their measurable risks involved in buying/selling their commodities. One example of an energy related retail commodity is motor fuels, which may include various grades of gasoline. For example, motor fuels may include 87 octane grade gasoline, 93 octane grade gasoline, etc as well as various grades of diesel fuels. Other examples of an energy related retail commodity could be jet fuel, heating oils, electricity or emission credits such as carbon offsets. Other retail commodities are possible and/or anticipated.

While a retail commodity and a wholesale commodity may refer to the same underlying good, they are associated with risks that can be measured and handled differently. One reason is that, while wholesale commodities generally involve sales of large quantities, retail commodities may involve much smaller transaction volumes and relate much more closely to how and where a good is consumed. The risks associated with a retail commodity therefore may be affected by local supply and demand and perhaps different factors. Within the context of this disclosure, there is a definable relationship between a retail commodity and the exposure of risks to the consumer. This retail level of the exposure of risks may correlate to the size and the specificity of the transaction in which the retail commodity is traded. Other factors may include the granularity of the geographic market where the transaction takes place, and so on. For example, the demand for heating oil No. 2 in January may be significantly different in the Boston market than in the Miami market.

No matter, what the commodity, however, in many instances individual consumers (which includes businesses) desire to financially protect themselves from potential increases in the price of a commodity to not only lower costs for themselves but, additionally, to create greater predictability in future costs for that commodity. For example, as the price of oil continues to fluctuate globally and fluidly, fuel prices at the pump can change from location to location on a daily or even hourly basis. In such a volatile market, a consumer or business may desire to protect themselves against adverse fluctuations.

Embodiments of the invention disclosed herein provide just such a method for a consumer (which may be a business, individual, etc.) to protect themselves against these adverse fluctuations. More specifically, embodiments of the invention disclose systems and methods for providing an insurance premium in association with an insurance strike price for a commodity such that by paying the insurance premium a consumer may obtain price protection for a commodity purchase. In particular, a consumer may obtain the right to be reimbursed for any amount paid over the insurance strike price for the commodity. While embodiments of the present invention will be illustrated using fuel as an example commodity it will be understood that embodiments of the present invention may apply equally well to almost any other commodity.

Based on the insurance premium, an intermediary may provide price protection contracts to consumers, where the provisioning of these price protection contracts may present a number of revenue generation opportunities. Examples of such provisioning can be found in application Ser. No. 11/705,571 by inventors Robert M. Fell, Scott Painter, Michael R. Bonsignore, Brian P. Reed, and Gary A. Magnuson, titled: "METHOD AND SYSTEM FOR PROVIDING PRICE PROTECTION FOR COMMODITY PURCHASING THROUGH PRICE PROTECTION CONTRACTS," and filed on Feb. 12, 2007 while examples of revenue models for generating revenue from the provisioning of these price protection contracts can be found in application Ser. No. 12/030,073 by inventors Robert M. Fell, Scott Painter, Michael R. Bonsignore, Brian P. Reed, Gary A. Magnuson, and Thomas D. Gros entitled "SYSTEM AND METHOD FOR GENERATING REVENUES IN A RETAIL COMMODITY NETWORK" and filed on Feb. 12, 2008 all of which are fully incorporated herein by reference.

Embodiments of the systems and methods of the present invention may be better explained with reference to FIG. 1 which depicts one embodiment of a topology which may be used in conjunction with the systems and methods of the present invention. Topology 100 comprises price protection system 120 which is coupled through network 170 to computing devices 110 (e.g. computer systems, personal data assistants, kiosks, dedicated terminals, etc), insurance provider 140, and one or more associated retail point of sale locations 160.

Insurance provider 140 may provide an insurance strike price and an associated insurance premium (for example a hedge cost per gallon or HCPG), such that by paying the insurance premium to the insurance provider the payer will be indemnified for any cost of fuel above the insurance strike price. Price protection system 120 may utilize the insurance strike price and associated insurance premium to provision price protection contracts to various consumers.

More particularly, fleet managers (or any other consumer) desiring to obtain protection from future increases in the retail price of fuel, or to increase predictability of future fuel costs, may access price protection system 120 to obtain price protection contracts pertaining to fuel. More specifically, in one embodiment, a fleet manager may access price protection system 120 on computing device 110 using a set of interfaces provided by price protection system 120 in order to provide a set of inputs regarding desired price protection to price protection system 120. Using these inputs, price protection system 120 may utilize an insurance strike price and an associated insurance premium provided by insurance provider 140 to determine a price protection contract.

Using the insurance strike price obtained from insurance provider 140 then, price protection system 120 may present the fleet manager with a price protection contract specifying at least one lock price, quantity, locale, fuel grade or time period, which the fleet manager can obtain if he desires. By obtaining this price protection contract the fleet manager guarantees the right to purchase the quantity of the specified grade of fuel at the lock price at a number of retail point of sale locations 160.

If a fleet manager purchases fuel where the retail price of the fuel is above the lock price, the operators of price protection system 120 may pay the retail point of sale location for the purchased quantity at the prevailing retail price, or some lesser or greater amount. For the quantity of fuel purchased then, the operators of price protection system 120 may recoup the difference between an insurance strike price and the prevailing retail price at the retail point of sale location at the time of purchase from insurance provider 140. Though insurance provider 140 may be a distinct entity from the operator of price protection system 120 such as a insurance provider or another entity or organization capable of providing an insurance premium associated with one or more insurance strike prices it will be realized that the operators of price protection system 120 may also perform the determination of the insurance strike price and an associated insurance premium (e.g. operators of price protection system 120 and insurance provider 140 may be one and the same or different according to various embodiments of the present invention).

Attention is now directed to an exemplary process flow for one embodiment of providing an insurance premium in conjunction with one or more insurance strike prices. Utilizing these insurance premiums and associated insurance strike prices an intermediary such as the operators of a price protection system 120 may provide price protection contracts to consumers (e.g. fleets or individual consumers) is depicted.

Figure 2:
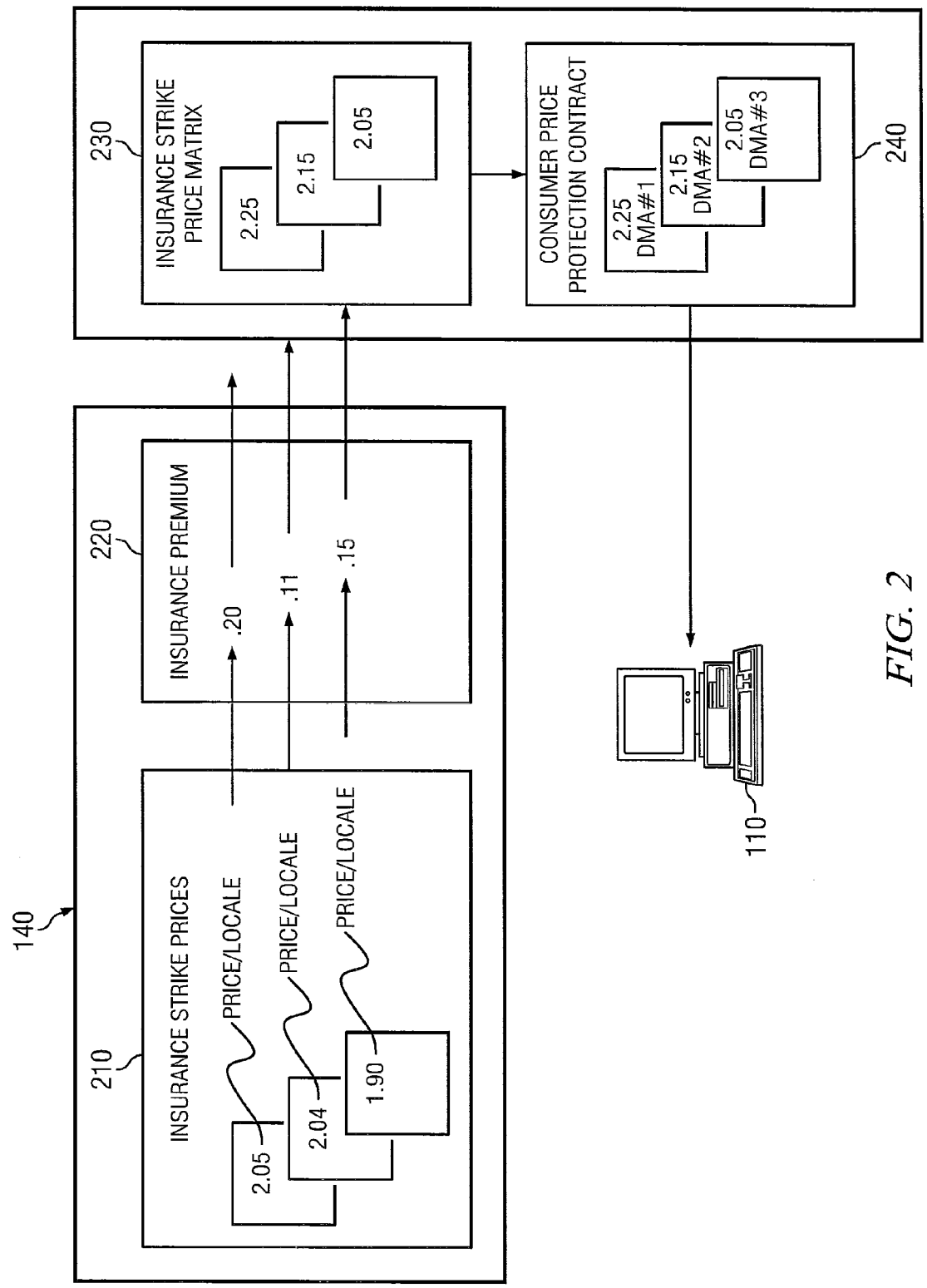
FIG. 2 is an illustration of one embodiment of the creation and use of an insurance strike price matrix.

Turning to FIG. 2, one embodiment of the provisioning of an insurance premium in association with an insurance strike is depicted. Insurance provider 140 may determine one or more insurance strike prices 220 and an associated insurance premium 220 to associate with the one or more insurance strike prices. In one embodiment, these insurance strike prices may be determined on a locale by locale basis where a locale may be any way of defining a geographic area of interest (including but not limited to countries, states, cities, metropolitan areas, zip codes, counties, area codes, designated market area (DMA), which may be any area where a consumer may receive similar offerings or prices, etc.

Thus, in one embodiment, for a particular locale, such as a DMA, insurance provider 140 may determine an insurance strike price (step 210) and associated insurance premium (step 220) for a particular fuel grade and time period. Insurance provider 140 may determine the insurance premium associated with a particular insurance strike price, fuel grade and time period, via one or more heuristic methodologies, including a Black-Scholes marketing formula. These heuristic methodologies may price the risk associated with providing indemnification associated with a particular insurance strike price and (e.g. in a particular locale, for a particular fuel grade for a particular time period) take into account such factors as demand for retail price protection, current retail price of fuel in that locale, analysis of forward markets, ability to hedge positions in a market, forward gas price calculations, the cost of wholesale futures for fuel, the wholesale price of fuel or almost any other factor or variable germane to the determination of insurance strike prices and insurance premiums (for example market data such as options/forward contracts on NY Harbor Wholesale Price of Gasoline from the New York Mercantile Exchange (NYMEX, also known as NY Merc or MERC). For example, insurance provider 140 may employ a model or simulation which may determine one or more wholesale strike prices and associated insurance premiums for a DMA based on the wholesale cost of fuel and add an estimated markup associated with that DMA to determine an insurance strike price for that DMA which may then be associated with the same insurance premium.

Insurance provider 140 may therefore, in one embodiment, determine an insurance premium for a particular locale, fuel grade, insurance strike price and time period. Sets of these locales, time periods, fuel grades, insurance strike prices and associated insurance premium may be grouped together to form an insurance provider strike price matrix.

FIGS. 3A and 3B depict representations of embodiments of a portion of an insurance provider strike price matrix. Here, in FIG. 3A an insurance provider strike price matrix 300 comprises a set of price decks 320 where a price deck 320 comprises a set of individual DMAs. Each of the individual DMAs of a price deck 320 is, in turn, associated with a time period, a fuel grade a per gallon insurance provider strike price and a HCPG 310, whereby if a party pays the insurance provider 140 the HCPG 310 they may be indemnified for any price above the corresponding insurance strike price in a corresponding price deck 320 provided that the fuel is of the associated grade and is purchased in the locale associated with the insurance provider strike price within the associated time period.

For example, with respect to price deck 320a, if a party pays a HCPG of $0.35, for a certain quantity of fuel, they may obtain the right to be indemnified by insurance provider 140 for any amount over $3.00 spent on a gallon of diesel fuel purchased in the Austin DMA in the next 6 months up to the quantity of fuel for which the HCPG was paid. It will be appreciated that the above embodiment is exemplary only, and that a wide variety of other configurations and formats for insurance provider strike price matrices may be utilized without loss of generality.

For example, in FIG. 3B an insurance provider strike price matrix 350 is associated with a grade or type of fuel and an index price 352 for that grade or type (index prices are discussed in more detail in U.S. application Ser. No. 12/099,253, by inventors Robert M. Fell, Scott Painter, Brian P. Reed, Michael R. Bonsignore, Gary A. Magnuson and Thomas Gros, entitled "SYSTEM AND METHOD FOR INDEX BASED SETTLEMENT UNDER PRICE PROTECTION CONTRACTS", and filed on Apr. 8, 2008, fully incorporated herein by reference). Insurance provider strike price matrix 350 also comprises set of individual DMAs 360 (or other geographical delineators as discussed above). Each of the individual DMAs 360 of the insurance provider strike price matrix 350 is, in turn, associated with a set of option types 370, each option type having an associated insurance strike price (which may be defined relative to the index price 352, such as the index price+0.30, etc.) and one or more subsets of other parameters, such as exercise options, constraints, etc. Therefore, in insurance provider strike price matrix 350 an insurance premium may be associated with a particular DMA, an insurance strike price and a certain option with a subset of parameters such that by paying that insurance premium they may be indemnified for any price above the insurance strike price according to the particular option and the set of parameters corresponding to the particular option selected provided that the fuel is of the associated grade or type and is purchased in the DMA.

Figure 4:
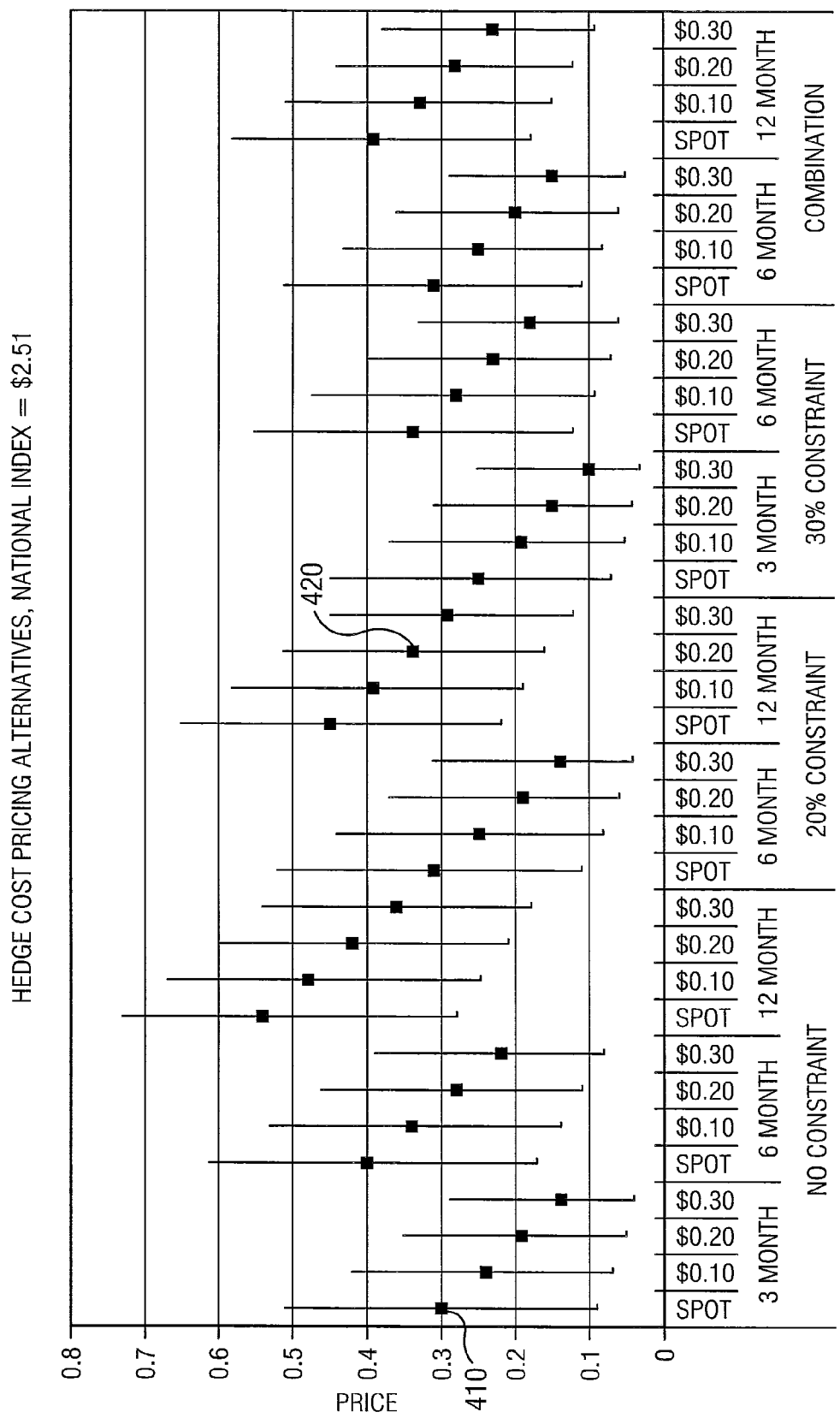
FIG. 4 is a graphical representation of one embodiment of an insurance strike price matrix.

A graphical representation of an embodiment of a portion of an insurance provider strike price matrix is depicted in FIG. 4. Here insurance provider strike price matrix 400 is based on an insurance strike price of $2.51 (which may be, in turn based on a national index average for fuel costs), where the Y axis represents the price of the option and X axis represents the protection offered. For example, point 410 indicates that by paying 30 cents a gallon one can obtain protection for an insurance strike price of $2.51 (here referred to as the spot price) for a 3 month period with no constraints governing the usage of this protection during the 3 months. Point 420 indicates that by paying about 0.35 cents per gallon one can obtain protection for an insurance strike price of $2.71 (0.20 cents above spot price) for a 12 month period with a 20% constraint on usage (e.g. no more than 20% of the total protection obtained may be exercised in a month, in other words if protection is obtained for 100 gallons of fuel no more than 20 gallons may be purchased under using this price protection each month).

Therefore, a party may utilize these insurance premiums to obtain price protection on the purchase of fuel from insurance provider 140. Based upon the ability to obtain price protection from insurance provider 140 a product (e.g. a contract) for price protection may be provided to a consumer by an intermediary utilizing the price protection offered by insurance provider.

This may be explained in more detail with reference back to FIG. 2, where price protection system 120 may receive the insurance provider strike price matrix (step 230). Based on the insurance strike price matrix, price protection system 120 may determine a product for a consumer such as a price protection contract (step 240). This price protection contracts may comprise a fuel grade, time period and a set of locales, where each of the locales (or groups of locales) may have a lock price or quantity associated with it. By obtaining a particular price protection contract the consumer may obtain the right for the time period specified to aggregately purchase the specified quantity of the grade of fuel in each of the locales at the lock price associated with the locales if the retail price of that grade of fuel goes above the associated lock price in the locale.

The terms of the price protection contract offered to the consumer from price protection system 120 may be different or the same as the terms of price protection offered to operators of price protection system from insurance provider 140 (e.g. in the provided insurance strike price matrix) or price protection obtained by operators of price protection system 120 from insurance provider based upon a consumer's obtaining a particular price protection contract. For example, the lock price may be greater or less than an insurance strike price, the time period offered in the contract may be longer or shorter than the time period provided for in the insurance strike price matrix, the fuel grade may be different, etc. It will be noted then that the price protection contract offered to a user may be based on a variety of factors including the price protection offered by insurance provider, the risk aversion (e.g. the decision to take on or not take on any risk) of operators of price protection system 120, revenue desired by operators of price protection system 120 and the methodologies employed to generate this revenue, etc.

Figure 5:
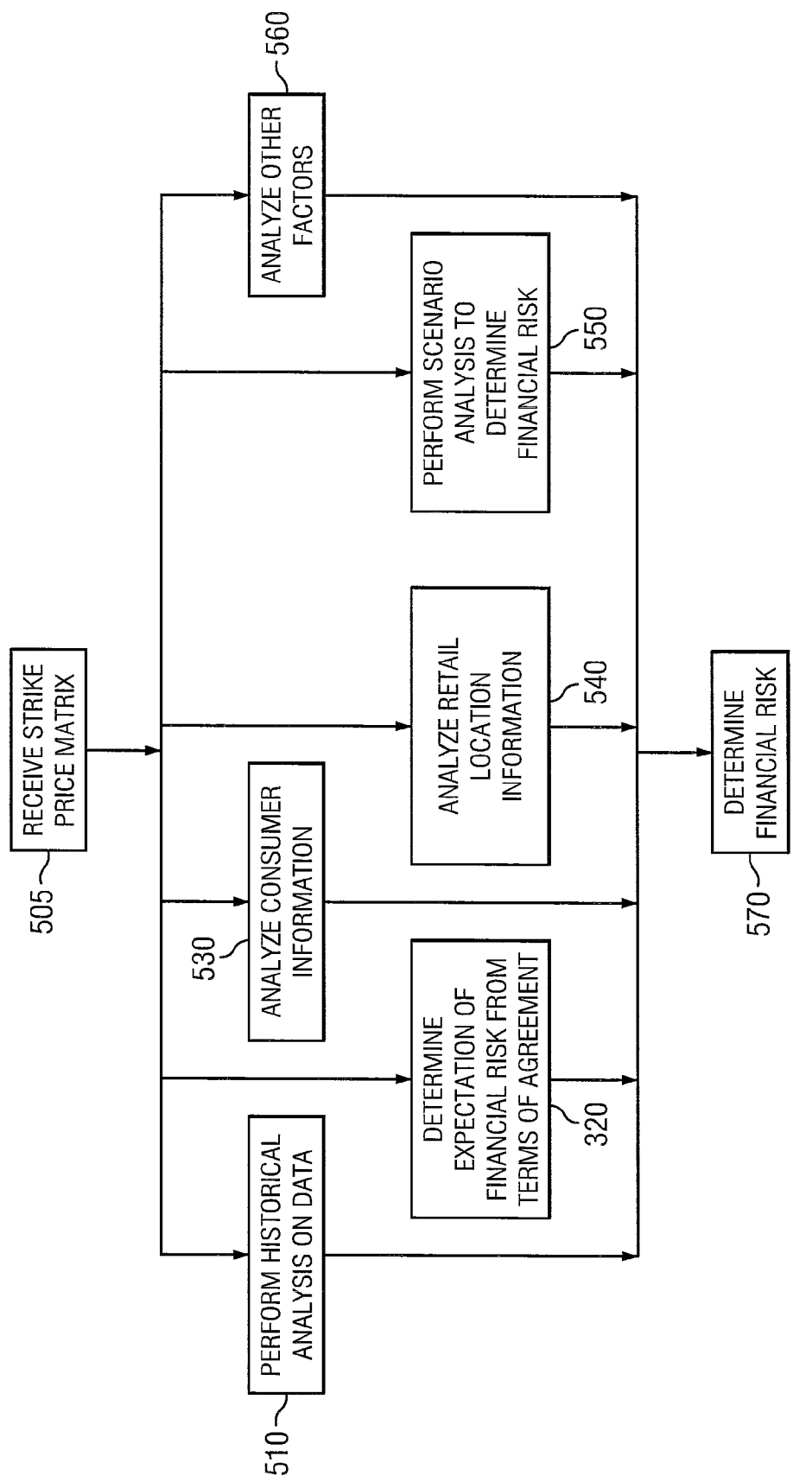
FIG. 5 is a flow diagram of one embodiment of a method for estimating financial risk.

The determination of such a consumer price protection contract may be better understood with reference to FIG. 5 which depicts a flow diagram of one embodiment of a method for determining or the financial risk in the provisioning of price protection. The determined financial risk may then be used in the provisioning of the consumer price protection contract, for example by providing a consumer price protection contract whereby the providers of the consumer contracts take on or lay off more or less risk.

In step 505, price protection system 120 may receive an insurance provider strike price matrix from insurer 140 as discussed above. Price protection system 120 (including its operators) may then perform analyses and determine a financial risk associated with offering a consumer the ability to obtain a price protection contract where the terms of the price protection contract may be changed from those provided to operators of price protection system by insurance provider 140 in the insurance provider strike price matrix.

The analysis may include historical analyses (at step 510), such as how an index price has fluctuated in recent months, what events affect the price of the commodity, how commodity prices have changed in response to local, regional and global events, how closely commodity prices in outlying areas have followed commodity prices in metropolitan areas, and the like. For example, weather can affect the price of heating oil. So, in some embodiments, a provider of a carbon-based energy product such as heating fuel may perform a historical analysis on the weather in January in the northeast part of the United States to determine the financial risk associated with providing a price protection contract for heating oil to consumers in Boston. The historical analysis of weather in the northeast may influence the provider to expect heating oil prices would be lower than that expected by insurance provider 140. In some embodiments, a provider of price protection contracts may offer a product for areas other than the DMAs specified in the insurance provider strike price matrix.

In these embodiments, for example, a historical analysis related to how closely prices in outlying areas have followed commodity prices in metropolitan areas may be performed. Thus, price protection system or its operators may determine that a higher or lower financial risk than the risk reflected in the insurance provider strike price matrix is being born in providing a certain consumer price protection contract.

At step 520, data may be analyzed to determine an expectation for the price of a commodity based on any of the terms of the insurance provider strike price matrix. For example, provider 120 may analyze market conditions for a given DMA based on the type of commodity, the quantity, and a time period. In other embodiments, provider 120 may analyze market conditions on terms other than what are in the insurance provider strike price matrix. For example, provider 120 may analyze market conditions at the zip code level and the insurance provider strike price matrix may be based on market conditions studied at the state level. Provider 120 may analyze market conditions weekly and insurer 140 may analyze market conditions monthly. Provider 120 may analyze market conditions based on settling the price against an aggregate price computed from transactions that occurred within a geographic boundary, and insurer 140 may analyze market conditions to determine an index price for settling.

The analysis may include both historical analysis and scenario analysis. Provider may analyze information received from consumers accessing price protection system 120 via computing devices to estimate a market condition that could affect the price of the commodity. Thus, provider 120 may determine a financial risk for a consumer price protection contracts based on broader or narrower terms than what is found in the insurance provider strike price matrix.

At step 530, provider 120 may analyze information relating to consumers 110. The information may be provided by consumers 110 accessing price protection system 120 via computing devices. The information may include past transactions, the quantity of the commodity consumed in other periods, the average price paid by consumer 110 in relation to other consumers 110 during the same time period, etc.

Other factors may also be taken into account in analyzing risk in the determination of a price protection contract. At step 540, provider 120 may analyze information relating to retail locations 160. The information may be provided by retail locations 160. The information may include the quantity of the commodity sold at location 160 in relation to other locations 160, the average price at which location 160 sold the commodity as compared to other locations 160, the storage capacity of location 160, etc. At step 550, price protection system 120 may perform scenario analyses of possible stress events. As an example, the price of retail gasoline may continue to rise. A scenario analysis of various stress events may be more reliable than historical analysis of some events. At step 560, price protection system 120 may further analyze other factors, such as the forward markets for the commodity, the current average retail price of the commodity; the ability of operators of price protection system 120 to generate revenue from any of a variety of sources, impending regulatory legislation, etc. For example, data received from sales of price protection contract at retail locations 160 may be analyzed to determine a financial risk. At step 570, price protection system 120 may compare the different analyses, weight them, or otherwise determine a financial risk for the commodity based on an analysis or analyses of data.

It may be helpful to an understanding of embodiments disclosed herein to illustrate specific examples of the altering (i.e., changing or adding terms) of terms in the provisioning of a price protection contract to accept more or less risk based on the indemnification options offered to the providers of price protection products. In one embodiment, the terms pertaining to price or time period may be altered to accept risk. For example, suppose insurance strike price matrix states offers protection against an insurance strike price of $2.50 per gallon in the Austin DMA for 6 months for a HCPG of 25 cents. In this case, a price protection contract may be presented to a consumer offering price protection in the Austin DMA for 6 months at a lock price of $2.45 per gallon for the purchase price of $2.75 per gallon. If the consumer obtains this price protection contract for a specified amount of fuel the operators of price protection system 120 may obtain indemnification for the same amount of fuel from insurance provider 140 according to the insurance strike price of $2.50 per gallon in the Austin DMA for 6 months for a HCPG of 25 cents. Here the operators of price protection system 120 have accepted 0.05 cents of risk on the amount of fuel on which price protection was obtained by the consumer. Similarly, price protection system 120 may offer a price protection contract to a consumer offering price protection in the Austin DMA for 7 months at a lock price of $2.50 per gallon for the purchase price of $2.75 per gallon. If the consumer obtains this price protection contract for a specified amount of fuel the operators of price protection system 120 may obtain indemnification for the same amount of fuel from insurance provider 140 according to the insurance strike price of $2.50 per gallon in the Austin DMA for 6 months for a HCPG of 25 cents. Here, the operators of price protection system 120 have accepted the risk that the price will be above the $2.50 per gallon lock price for the additional month of the price protection contract relative to the indemnification obtained from insurance provider 140.

In some embodiments, providers of price protection may change the manner in which the settlement of a provided price protection contract is performed. To illustrate, suppose insurance strike price matrix states offers protection against an insurance strike price of $2.50 per gallon in the Austin DMA for 6 months for a HCPG of 25 cents, where the indemnification from the insurance provider 140 to operators of price protection system 120 is to be determined according to an index price (e.g. the difference between the index price and the insurance strike price). In this case, price protection system 120 may offer a price protection contract to consumer 110 offering price protection in the Austin DMA for 6 months at a lock price of $2.50 per gallon for the purchase price of $2.75 per gallon. Any transactions under this price protection contract may be settled against the retail price at the retail point of location where the transaction occurs. If a consumer obtains this price protection contract for a selected amount of fuel the operators of price protection system 120 may obtain indemnification for the same amount of fuel from insurance provider 140 according to the insurance strike price of $2.50 per gallon in the Austin DMA for 6 months for a HCPG of 25 cents where the indemnification is determined with respect to the index price. Here the providers of price protection 120 have assumed the risk of any difference between the retail price at the retail point of sale location where fuel is purchased and the index price at the time of the transaction.

In some embodiments, providers of price protection may add terms to a price protection contract which place constraints on a consumer's exercise of their rights under the product. To illustrate, suppose insurance strike price matrix states offers protection against an insurance strike price of $2.50 per gallon in the Austin DMA for 6 months for a HCPG of 25 cents. In this case, a price protection contract may be presented to a consumer offering price protection in the Austin DMA for 6 months at a lock price of $2.50 per gallon for the purchase price of $2.75 per gallon where the consumer may only deplete 20% of the amount of fuel purchased under the price protection contract in a given month. If the consumer obtains this price protection contract for a certain amount of fuel the operators of price protection system 120 may obtain indemnification for the same amount of fuel from insurance provider 140 according to the insurance strike price of $2.50 per gallon in the Austin DMA for 6 months for a HCPG of 25 cents where the indemnification is determined with respect to the index price. Here the providers of price protection contract 120 accepted less risk by placing these constraints on the exercise of the price protection contract by the consumer. If the consumer exceeds the depletion constraint the consumer may be responsible for the purchase of any amount of fuel exceeding this constraint at the then prevailing retail price at the point of sale location. For example, suppose that a consumer purchases 120 gallons of fuel under the example price protection contract discussed above with a 30% per month depletion constraint. Suppose now that in the first month after obtaining the price protection contract the consumer purchases 44 gallons of fuel above the lock price of the price protection contract. In this example, the operators of price protection system 120 may pay the retail point of sale location where the fuel was purchased for 36 gallons under the price protection contract and the 44 gallons may be depleted from the consumer' virtual reserve. The consumer, however, may be responsible for paying the then prevailing retail price at the retail point of sale location for the 8 gallons that exceeded the terms of the price protection contract. This amount, for example, may be billed through to a credit card associated with the consumer's account.

It will be noted that the above descriptions and examples are for illustrative purposes only and that terms may be changed, added, or otherwise altered to take on or lay off risk in almost any manner imaginable, and that almost any alteration of terms in the provisioning of a price protection contract for the purchase of a commodity will be encompassed by the scope of embodiments of the invention disclosed herein.

In the foregoing specification, the invention has been described with reference to specific embodiments. However, one of ordinary skill in the art will appreciate that various modifications and changes can be made without departing from the spirit and scope of the invention disclosed herein. Accordingly, the specification and figures disclosed herein are to be regarded in an illustrative rather than a restrictive sense, and all such modifications are intended to be included within the scope of the invention.

Benefits, other advantages, and solutions to problems have been described above with regard to specific embodiments. However, the benefits, advantages, solutions to problems, and any components that may cause any benefit, advantage, or solution to occur or become more pronounced are not to be construed as a critical, required, or essential feature or component of any or all the claims.

What is claimed is:

1. A method for providing insurance for commodity purchasing, comprising:
    creating a first insurance strike price matrix corresponding to a commodity at an insurance system, wherein the first insurance strike price matrix comprises a first set of insurance strike prices and associated insurance premiums for a first set of locales, wherein each insurance strike price and associated first insurance premium is associated with a locale selected from the first set of locales;
    obtaining a payment associated with a first insurance strike price and associated insurance premium associated with a locale selected from the first set of locales from a first consumer; and
    indemnifying the first consumer for purchases of the commodity based upon the first insurance strike price, wherein the insurance strike price matrix is used to provide a price protection contract for a commodity to a second consumer based on data regarding desired price protection obtained from the second consumer, where the price protection contract has an associated time period, lock price and locale wherein the lock price is associated with the selected locale and is determined based upon the first insurance strike price and associated insurance premium for the selected locale and for a set of purchases occurring in the locale during the time period the consumer has a right to aggregately purchase the commodity and, wherein for each purchase within the locale the commodity may be purchased at the lock price associated with the locale if a first index price associated with the commodity and the locale at a first time of the purchase is above the lock price associated with the locale or at a retail price of the commodity otherwise.

2. The method of claim 1, wherein the commodity is fuel.

3. The method of claim 1, further comprising:
    creating a second insurance strike price matrix, wherein the second strike price matrix comprises a second set of insurance strike prices and associated insurance premiums for a second set of locales wherein the second set of locales includes one or more locales from the first set of locales.

4. The method of claim 3, wherein determining the lock price associated with the locale selected from the first set of locales comprises assessing a risk based upon the first insurance strike price and associated insurance premium associated with the selected locale.

5. The method of claim 4, wherein creating the second insurance strike price matrix comprises analyzing historical retail pricing for the commodity within a locale selected from the first set of locales.

6. The method of claim 5, further comprising analyzing how closely retail commodity prices in outlying locales have followed retail commodity prices in metropolitan locales.

7. A system for commodity purchasing, comprising:
an insurance system, the insurance system operable for:
creating a first insurance strike price matrix corresponding to a commodity, wherein the first insurance strike price matrix comprises a first set of insurance strike prices and associated insurance premiums for a first set of locales, wherein each insurance strike price and associated first insurance premium is associated with a locale selected from the first set of locales;
obtaining a payment associated with a first insurance strike price and associated insurance premium associated with a locale selected from the first set of locales from a first consumer; and
indemnifying the first consumer for purchases of the commodity within the locale selected from the first set of locales based upon the first insurance strike price selected from the first set of insurance strike prices.

8. The system of claim 7, wherein the commodity is fuel.

9. The system of claim 7, further comprising:
creating a second insurance strike price matrix, wherein the second strike price matrix comprises a second set of insurance strike prices and associated insurance premiums for a second set of locales wherein the second set of locales includes one or more locales from the first set of locales.

10. The system of claim 9, further comprising:
a price protection system operable for:
obtaining data regarding desired price protection from a second consumer; and
providing a price protection contract for a commodity to the second consumer where the price protection contract has an associated time period, lock price and locale wherein the lock price is associated with the selected locale and is determined based upon the first insurance strike price and associated insurance premium for the selected locale and for a set of purchases occurring in the locale during the time period the consumer has a right to aggregately purchase the commodity and, wherein for each purchase within the locale the commodity may be purchased at the lock price associated with the locale if a first index price associated with the commodity and the locale at a first time of the purchase is above the lock price associated with the locale or at a retail price of the commodity otherwise.

11. The system of claim 10, wherein determining the lock price associated with the locale comprises assessing a risk based upon the first insurance strike price and associated insurance premium.

12. The system of claim 11, wherein the assessing of the risk and the providing of the price protection contract is done by the price protection system.

13. The system of claim 12, further comprising analyzing how closely retail commodity prices in outlying locales have followed retail commodity prices in metropolitan locales.

14. A non-transitory computer readable media for providing insurance for commodity purchasing, the computer readable media comprising instructions executable for:
creating a first insurance strike price matrix corresponding to a commodity, wherein the first insurance strike price matrix comprises a first set of insurance strike prices and associated insurance premiums for a first set of locales, wherein each insurance strike price and associated first insurance premium is associated with a locale selected from the first set of locales;
obtaining a payment associated with a first insurance strike price and associated insurance premium associated with a locale selected from the first set of locales from a first consumer; and
indemnifying the first consumer for purchases of the commodity within the locale selected from the first set of locales based upon the first insurance strike price selected from the first set of insurance strike prices.

15. The non-transitory computer readable media of claim 14, wherein the commodity is fuel.

16. The non-transitory computer readable media of claim 15, wherein the instructions are further executable for:
creating a second insurance strike price matrix wherein the second strike price matrix comprises a second set of insurance strike prices and associated insurance premiums for a second set of locales, wherein the second set of locales includes one or more locales from the first set of locales.

17. The non-transitory computer readable media of claim 16, wherein the instructions are further executable for:
obtaining data regarding desired price protection from a second consumer; and
providing a price protection contract for a commodity to the second consumer where the price protection contract has an associated time period, lock price and locale wherein the lock price is associated with the selected locale and is determined based upon the first insurance strike price and associated insurance premium for the selected locale and for a set of purchases occurring in the locale during the time period the consumer has a right to aggregately purchase the commodity and, wherein for each purchase within the locale the commodity may be purchased at the lock price associated with the locale if a first index price associated with the commodity and the locale at a first time of the purchase is above the lock price associated with the locale or at a retail price of the commodity otherwise.

18. The non-transitory computer readable media of claim 17, wherein determining the lock price associated with the locale selected from the first set of locales comprises assessing a risk based upon the first insurance strike price and associated insurance premium associated with the selected locale.

19. The non-transitory computer readable media of claim 18, wherein the assessing of the risk and the providing of the price protection contract is done by the first consumer.

20. The computer readable media of claim 19, further comprising analyzing how closely retail commodity prices in outlying locales have followed retail commodity prices in metropolitan locales.

* * * * *